United States Patent [19]

Barrett

[11] 4,097,949
[45] Jul. 4, 1978

[54] ELECTRICAL ASSEMBLY FOR LIFTING BIASED DOWN DOCK LEVELERS

[76] Inventor: Jack P. Barrett, 43 Athlone Ave., Bramalea, Ontario, Canada

[21] Appl. No.: 733,915

[22] Filed: Oct. 19, 1976

[51] Int. Cl.² ............................................. E01D 1/00
[52] U.S. Cl. .................................................. 14/71.3
[58] Field of Search ...................... 14/71.3, 71.1, 69.5

[56] References Cited

U.S. PATENT DOCUMENTS

| | | | |
|---|---|---|---|
| 1,380,229 | 5/1921 | Manheim | 14/71.1 X |
| 1,905,947 | 4/1933 | Morgan | 14/71.1 |
| 2,904,802 | 9/1959 | Hartman | 14/71.3 |
| 2,974,336 | 3/1961 | Kelley | 14/71.3 |
| 3,137,017 | 6/1964 | Pfleger | 14/71.3 |
| 3,189,199 | 6/1965 | Eaton | 14/71.1 X |
| 3,249,956 | 5/1966 | Zajac | 14/71.3 |
| 3,316,575 | 5/1967 | Larsen | 14/71.3 |
| 3,411,169 | 11/1968 | Guerke | 14/71.1 |
| 3,786,530 | 1/1974 | Le Clear | 14/71.3 |
| 3,902,213 | 9/1975 | Pfleger | 14/71.3 |

*Primary Examiner*—Nile C. Byers
*Attorney, Agent, or Firm*—Ivor M. Hughes

[57] ABSTRACT

An electrical assembly which can be conveniently added to a biased down dock leveler, having a ramp already in use, or around which a dock leveler could be manufactured and installed at the end user's facilities, for lifting the dock leveler comprising an electric motor, means to activate the motor and a scissors arm adapted to be raised from a lowered position by the motor, the scissors arm being pivotally secured to a pivot arm which is hinged for rotational movement about one end, the other end being adapted to lift the ramp of the leveler whereby when the scissors arm is raised, the pivot arm is raised, thus raising the ramp of the leveler, the electric motor being of such construction that when inactive, it does not preclude the manual lifting and lowering of the ramp.

5 Claims, 5 Drawing Figures

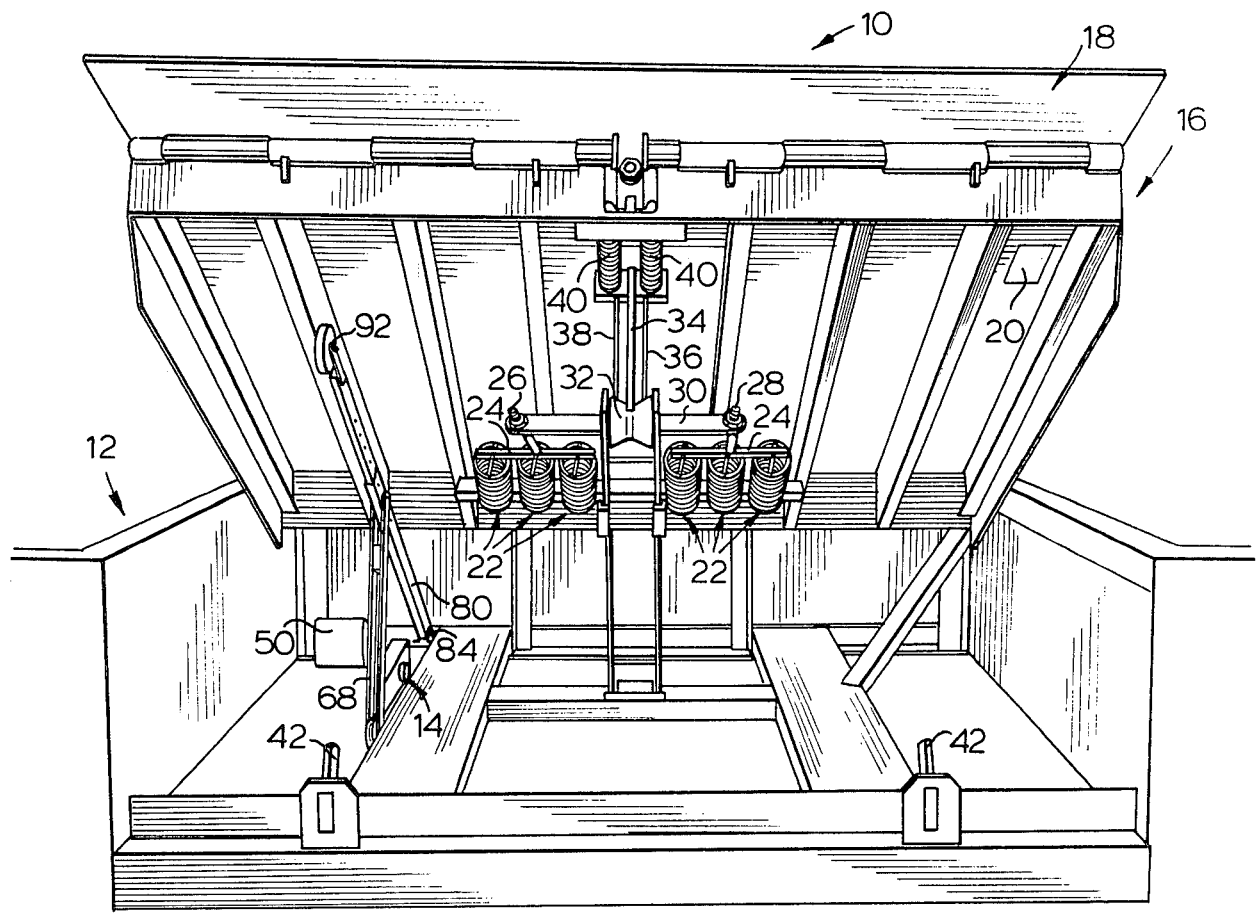
FIG. 1
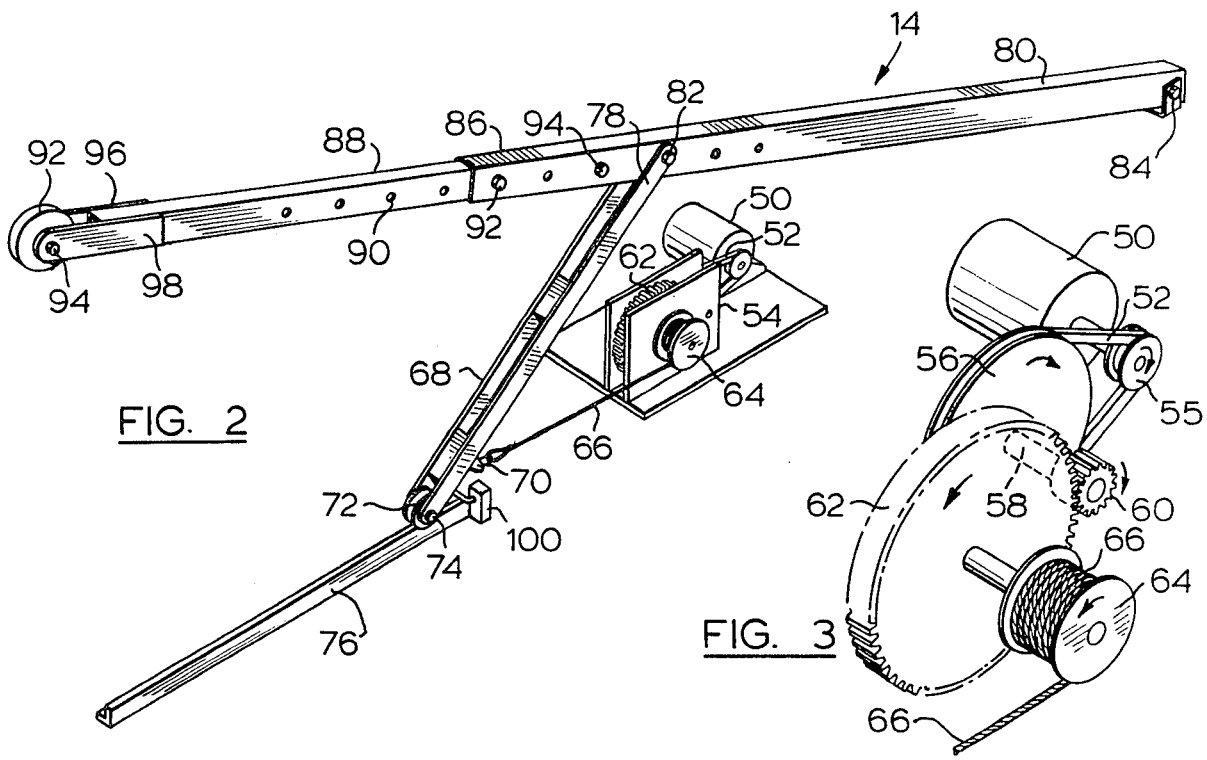
FIG. 2
FIG. 3

ELECTRICAL ASSEMBLY FOR LIFTING BIASED DOWN DOCK LEVELERS

FIELD OF THE INVENTION

This invention relates to an electrical elevating assembly useful in the lifting of biased down dock levelers.

BACKGROUND OF THE INVENTION

Great assistance has been obtained from the use of dock levelers in unloading goods from trailer trucks at, for example, warehouses. The reason for this is that both the levels of the truck trailer beds, and the unloading ramps of the destination facilities vary, relative to ground level, with the result that where a platform is provided onto which goods in a trailer are to be unloaded, a ramp must be provided to bridge the trailer bed and warehouse platform to permit for example, electric trucks and dollies to ride from one to the other while transfering the load.

An example of a dock leveler is that disclosed in Rite Hite Corporation's Bulletin Number 8467-2 entitled "SEMI-AUTOMATIC HINGED LIP ADJUSTABLE DOCK LEVELER", wherein the leveler disclosed is what is known as a biased down dock leveler and is semi-automatic, meaning that when the vehicle leaves the warehouse dropping the ramp, the ramp first falls, retracting the lip. The ramp then rises to a position above the dock level and then automatically returns to the dock level, returning the lip to the keepers.

Such dock leveling system provides a hole, adjacent the outer end of the dock leveler near the lip for manually lifting the leveler by grasping the ramp. The leveler itself is spring counterbalanced, and therefore, when the leveler is lifted, the dock rises forcing the hinged lip upwardly and outwardly until it locks into place. While the spring counter-balancing, properly adjusted, reduces the stress on the person lifting the ramp, nevertheless, injuries to the arms, shoulders and back are common, resulting in considerable loss of time on the job, and union labour disputes. While hydraulic systems have been provided in the past, to assist in raising and lowering the ramp, they are both costly and when they break down, the ramp itself is inoperable until such system is repaired.

Furthermore, such hydraulic systems must be incorporated into such dock levelers at the time of installations with the result that a person wishing to modify his previously installed dock leveler to incorporate a hydraulic lift system, must replace the whole structure, thereby significantly increasing costs.

It is therefore, an object of this invention to provide an electrical elevating assembly, which can be added to existing biased down dock levelers of which can be incorporated at the time of installation of such levelers for lifting the leveler.

It is a further object of this invention to provide such an assembly at minimum cost and with few components requiring little maintenance.

It is a further object of this invention to provide an assembly which if it breaks down, does not render the dock leveler inoperable until the assembly is repaired.

Further and other objects of this invention will be realized by those skilled in the art, from the following summary of the invention and detailed description of the following preferred embodiment thereof.

SUMMARY OF THE INVENTION

"According to one aspect of the invention, such electrical elevating assembly for elevating a biased down dock leveler is provided, such assembly comprising an electric motor, a scissors arm adapted to be raised from a lowered position by the motor, means to activate the motor and means to permit the motor to raise the dock leveler."

According to another aspect of the invention, the scissors arm is pivotally secured to a pivot arm which pivot arm is hinged for rotational movement about one end so that when the scissors arm is raised, the pivot arm is raised.

According to another aspect of the invention, the pivot arm is adapted to lift the ramp of the leveler when the pivot arm is lifted.

According to another aspect of the invention, when the motor is inactive, it does not preclude the manual lifting and lowering of the ramp.

"According to another aspect of the invention, an electrical elevating assembly for elevating a biased down dock leveler is provided, the assembly comprising an electric motor, adapted to draw one end of a scissors arm towards the motor when activated, means to activate the motor and means to permit the motor to draw the scissors arm towards the motor."

According to another aspect of the invention, the other end of the scissors arm is pivotally secured to an intermediate portion of a pivot arm which pivot arm is hinged for rotational movement about one end.

According to another aspect of the invention, means are provided on the other end of the pivot arm to ride on the undersurface of the dock leveler ramp as the ramp is lifted to reduce frictional wear and tear between the ramp and pivot arm.

According to another aspect of the invention, when the motor is inactive, it does not preclude the manual lifting and lowering of the ramp.

Preferably the end of the pivot arm, hinged to permit rotational movement of the pivot arm, is secured adjacent the end of the ramp, remote the lip.

Preferably, the electric motor is connected to a speed reducing gear box, in turn secured to a wire cable drum in the dock leveling pit, and a cable extends outwardly from the drum and is secured to the end of the scissors arm to be drawn towards the motor.

Preferably, such end of the scissors arm has a roller thereon having a V-groove and such roller rides on a rail.

Preferably the pivot arm has on the end of the arm engaging the underside of the ramp a roller.

The pivot arm may also have two portions, one portion telescoping into the other, secured for example, to one another, by a force fit between the sections and by bolts inserted through aligned apertures in the sections to permit use with varying lengths of dock levelers.

Therefore, in operation, upon the activation of, for example, a switch, the electric motor raises the scissors arm by, for example, drawing the lower end of the scissors arm towards it, causing the pivot arm to rise generally upwardly, thereby forcing the ramp upwards.

To assist in further understanding the invention, the invention will now be illustrated with reference to the following figures, illustrating a preferred embodiment of the invention, in which:

FIG. 1 is a perspective view of the preferred embodiment of the invention, incorporated into a biased down dock leveler in the raised position;

FIG. 2 is a perspective view of the preferred embodiment of the invention shown in FIG. 1;

FIG. 3 is a close up view of part of FIG. 2.

DESCRIPTION OF THE PREFERRED EMBODIMENTS OF THE INVENTION

Figure 4:
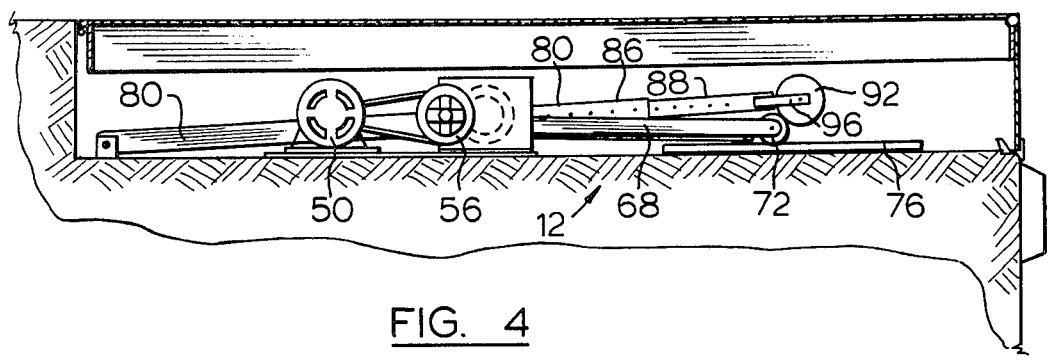
FIGS. 4 and 5 are schematic drawings illustrating the preferred embodiment shown in FIGS. 1 and 2, in the lowered and raised positions.

With reference to FIG. 1, there is shown a biased down dock leveler generally indicated as 10, mounted in a dock leveler pit 12, incorporating the preferred embodiment of the invention, generally indicated as 14.

Since the dock leveler and dock leveler pit form no part of the invention, and since any biased down dock leveler could be used of any construction, the dock leveler shown in the drawings will be discussed briefly. However, the example leveler used to illustrate the preferred embodiment of the invention, is the same leveler as shown in Rite Hite Corporation's Bulletin Number 8467-2 entitled "SEMI-AUTOMATIC HINGED LIP ADJUSTABLE DOCK LEVELER".

Essentially, such biased down dock leveler 10 includes a ramp 16, and a hinged lip 18 secured thereto. The ramp 16 has an opening 20 therein to facilitate the manual lifting of the leveler. The leveler is partially counter-balanced with a spring system to assist in the manual elevation of same.

As the platform or ramp 16 is lifted, the springs 22 are tensed. Arms 24 connect the springs to steel rods 26 and 28, which have axle 30 secured thereto. Disposed intermediate axle 30 is roller 32 which rotates on cam 34 as the springs are tensed.

Cam 34 in turn pivots which in turn causes arms 36 and 38 on either side of cam 34 to compress springs 40, which extends the lip 18, hingedly connected to ramp 16. As lip 18 fully extends, it is locked into position by a locking mechanism (not shown). A lip retracting mechanism (not shown) at the back of the ramp 16 can be used to unlatch the lip at any time.

When for example, a truck leaves, the ramp 16 and lip 18 first fall below the dock level, and due to the counter-balance spring system, the compression of springs 22, the ramp rises above the level of the dock, the lip retracts and the dock with the lip, seats in the lip keepers 42.

The biased down dock leveler 10 in FIG. 1 incorporates the preferred embodiment of the invention, assembly 14, for use to lift the dock leveler using an electrical motor 50, manufactured by General Electric Limited, Type KC Model 4J242 FGY4.

With reference to FIG. 2, there is shown a close up of assembly 14 which includes motor 50 secured by a belt pulley 52 to a speed reducing gear box 54 the contents of which are shown in close up in FIG. 3. With reference to FIG. 3, belt 52 passes over pulley 55, secured to motor 50 and larger pulley 56. Larger pulley 56 is in turn secured by axle 58 to gear 60, meshed with gear 62, which in turn is journaled co-axially for rotation with cable drum 64, holding cable 66.

Cable 66 is in turn secured to scissors arm 68 by coupling 70, scissors arm 68 holding V-grooved roller 72 on one end, journaled for rotation on axle 74 secured to scissors arm 68. Roller 72 is adapted to ride on rail 76, as cable 66 is pulled in or let out.

The other end 78 of arm 68 is in turn pivotally secured to pivot arm 80 by pin 82 passing through both arms 78 and 80. Pivot arm 80 is pivotably secured in dock leveler pit adjacent the end of the ramp 16 remote lip 18 (Seen in FIG. 1), and includes two portions, housing 86 and telescoping portion 88 of such configuration to provide a frictional force fit therebetween. Each of portions 86 and 88 have apertures 90 therein, for alignment thereof to secure two pins 92 and 94 therethrough, to secure the portions 86 and 88 together. The end of arm 80 carries a roller 92 journaled for rotation on axle 94 secured between two members 96 and 98 secured on the end of telescoping member 88.

In operation, when motor 50 is activated by a switch (not shown) causing belt 52 to turn, thereby driving gear 60, in turn driving gear 62, cable drum 64 is rotated in the direction of the arrows shown in FIG. 3, thereby pulling scissors arm 68 on rail 76 towards the motor. As this happens, pivot arm 80 is elevated by the movement of arm 68, causing roller 92 to ride on the underside of the ramp 16 to raise ramp 16.

As cable 66 in drum 64 is taken up, pulling arm 68 on rail 76 towards motor 50, arm 68 engages limit switch 100 connected to motor 50, thus disengaging motor 50, stopping operation.

After the truck leaves, the ramp returns to level as previously described, since the disengagement of the motor does not interfere with the inherent operational features of the leveler.

Figure 5:
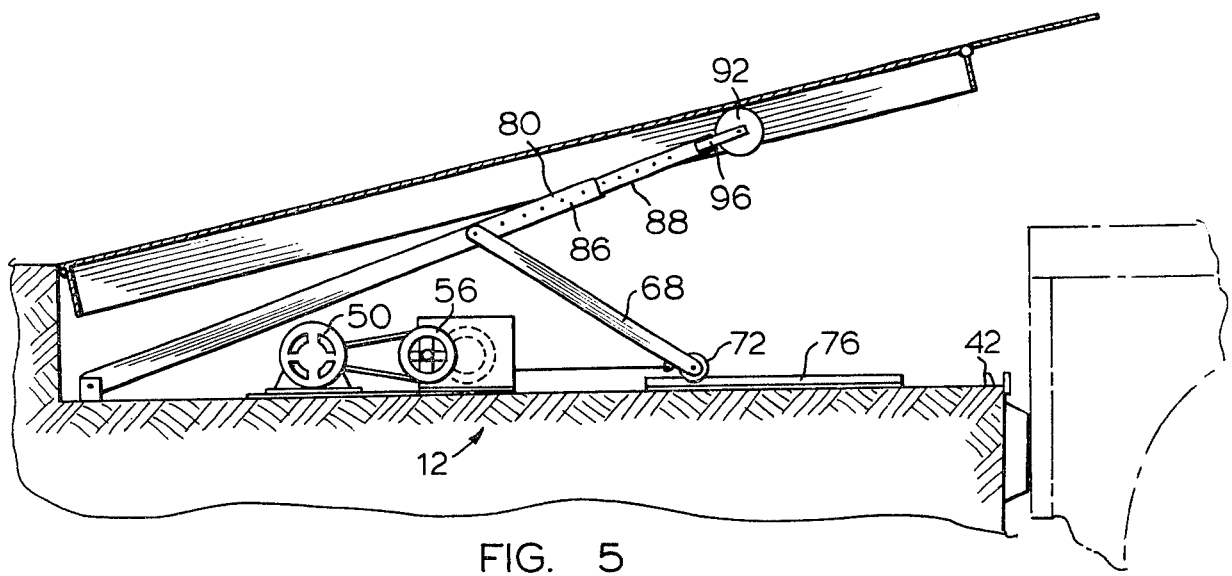

FIGS. 4 and 5 illustrate the operation discussed above, FIG. 4 illustrating the ramp in closed position and FIG. 5 in the fully extended position.

As many changes could be made in the assembly described in the preferred embodiment, without departing from the scope of the invention, it is intended that all matter contained be interpreted as illustrative of the invention, and not in a limiting sense.

The embodiments of the invention in which an exclusive property or privilege is claimed, are as follows:

1. The combination of a biased down dock leveler having a ramp, and lip at one end and an electrical elevating assembly positioned under the ramp for elevating the ramp of the dock leveler, said assembly comprising an electric motor, cable drum, cable stored in said cable drum, scissors arm, and pivot arm, and means to activate the electric motor, said electric motor connected to the cable drum for taking up and letting out the cable stored in the drum, the free end of the cable being secured adjacent the end of the scissors arm remote the ramp adjacent the floor of the dock leveler for the taking up and letting out of such end of the scissors arm as the cable is taken up or played out from the drum, the other end being connected to a central portion of the pivot arm connected at the end of the pivot arm remote the lip of the ramp, to the dock leveler at a position below the ramp for pivoting of said arm about said position, the other end riding on the underside of the ramp and causing the ramp to be elevated when the motor is activated by drawing the cable to be taken up into the cable drum, the electric motor being of such construction that when inactive, it does not preclude the manual lifting and lowering of the ramp.

2. The combination of claim 1 wherein said electrical elevating assembly includes a limit switch positioned in the path of the scissors arm as it is drawn towards the drum, for disengaging the motor.

3. The combination of claim 1 wherein a roller is provided on the end of the pivot arm adjacent the lip to engage the undersurface of the ramp.

4. The combination of claim 1 wherein the pivot arm comprises two portions, one portion telescoping into the other, which portions are secured to one another by a force fit exerted between the sections and by bolts inserted through aligned apertures in the sections.

5. The combination of claim 1 wherein the motor is connected to the drum through a speed reducing gear box, including a smaller gear connected to the motor and a larger gear meshed therewith.

* * * * *